United States Patent
Patil et al.

(10) Patent No.: US 12,086,263 B2
(45) Date of Patent: Sep. 10, 2024

(54) UTILIZING FEDERATION RELATIONSHIP SETTINGS AMONG DIFFERENT SYSTEMS

(71) Applicant: International Business Machines Corporation, Armonk, NY (US)

(72) Inventors: Sandeep Ramesh Patil, Pune (IN); Sridhar Muppidi, Austin, TX (US); Yu-Cheng Hsu, Tucson, AZ (US); Smita J. Raut, Pune (IN); Shajeer K. Mohammed, Bangalore (IN); Piyush Chaudhary, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 17/475,085

(22) Filed: Sep. 14, 2021

(65) Prior Publication Data

US 2023/0079199 A1    Mar. 16, 2023

(51) Int. Cl.
  *G06F 21/57*    (2013.01)
  *G06F 9/50*    (2006.01)

(52) U.S. Cl.
  CPC ............ *G06F 21/577* (2013.01); *G06F 9/505* (2013.01)

(58) Field of Classification Search
  CPC ...... G06F 21/577; G06F 9/505; G06F 9/5072; G06Q 10/0635
  See application file for complete search history.

(56) References Cited

U.S. PATENT DOCUMENTS

| 10,235,530 B2 | 3/2019 | Dryfoos et al. |
| 11,416,450 B1 * | 8/2022 | Du ........................ H04L 9/0894 |
| 11,681,557 B2 * | 6/2023 | Yardeni ................. G06F 3/0659 |
| | | 718/104 |

(Continued)

FOREIGN PATENT DOCUMENTS

| AU | 2021101420 A4 | 5/2021 |
| CN | 106209978 A | 12/2016 |

(Continued)

OTHER PUBLICATIONS

International Search Report and Written Opinion from PCT Application No. PCT/CN2022/11940, dated Nov. 1, 2022.

(Continued)

*Primary Examiner* — Michael R Vaughan
(74) *Attorney, Agent, or Firm* — Zilka-Kotab, P.C.

(57) ABSTRACT

A computer-implemented method, according to one embodiment, includes: determining, for each pair of HCI systems where each pair includes a first HCI system coupled to another HCI system, a federation relationship setting that corresponds to each pair. The federation relationship settings are used to control a flow of data, as well as to control a flow of workload scheduling, between the first HCI system and the other HCI systems in the respective pairs. Moreover, determining a federation relationship setting that corresponds to a pair includes: determining whether a risk score which corresponds to the pair is outside a predetermined range. In response to determining that the risk score is outside the predetermined range, a restrictive federation (Continued)

relationship setting is assigned to the pair, and in response to determining that the risk score is not outside the predetermined range, a permissive federation relationship setting is assigned to the pair.

20 Claims, 9 Drawing Sheets

(56) References Cited

U.S. PATENT DOCUMENTS

| | | |
|---|---|---|
| 2006/0021017 A1 | 1/2006 | Hinton et al. |
| 2012/0036566 A1 | 2/2012 | Nicholson et al. |
| 2014/0244311 A1 | 8/2014 | Dawson et al. |
| 2017/0090774 A1 | 3/2017 | Jayaraman et al. |
| 2018/0316555 A1 | 11/2018 | Salgueiro et al. |
| 2019/0340261 A1 | 11/2019 | Jain et al. |
| 2020/0004570 A1 | 1/2020 | Glade et al. |
| 2020/0028764 A1 | 1/2020 | Zhang et al. |
| 2020/0133733 A1 | 4/2020 | Andersen et al. |
| 2020/0151024 A1 | 5/2020 | Ji et al. |
| 2021/0011880 A1* | 1/2021 | Marelas ............... G06F 11/1448 |
| 2021/0055862 A1 | 2/2021 | Mulholland et al. |
| 2021/0117377 A1 | 4/2021 | Savir et al. |
| 2021/0144517 A1* | 5/2021 | Guim Bernat ...... H04L 41/0869 |
| 2022/0043642 A1* | 2/2022 | Maturi ................. G06F 9/45533 |
| 2022/0138041 A1* | 5/2022 | Degrass ............. G06F 11/0709 714/38.1 |
| 2022/0210226 A1* | 6/2022 | Nijhawan ............. H04L 49/354 |
| 2022/0215111 A1* | 7/2022 | Ekins .................. G06F 21/6218 |
| 2022/0391532 A1* | 12/2022 | Le ....................... G06F 9/45558 |
| 2022/0404786 A1* | 12/2022 | Amaro, Jr. ......... G05B 19/0421 |
| 2024/0069952 A1* | 2/2024 | Berry ....................... G06F 8/60 |

FOREIGN PATENT DOCUMENTS

| | | |
|---|---|---|
| CN | 109684071 A | 4/2019 |
| CN | 110675150 A | 1/2020 |

OTHER PUBLICATIONS

Gagllordi, N., "IBM patents privacy engine for cross-border data sharing," ZDNet, Nov. 14, 2014, 7 pages, retrieved from https://www.zdnet.com/article/ibm-patents-privacy-engine-for-cross-border-data-sharing/.

Chandramouli et al., "Security Guidelines for Storage Infrastructure," National Institute of Standards and Technology, NIST Special Publication 800-209, Oct. 2020, 79 pages.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

CSRC, "Cloud Computing," Computer Security Resource Center, Oct. 2017, 3 pages, retrieved from https://csrc.nist.gov/projects/cloud-computing.

* cited by examiner

| HCI System Name: IP Address | Location | Federation Relationship Setting |
|---|---|---|
| System B : 9.x.x.1 | USA | Full Federation |
| System C : 9.x.x.2 | UK | Semi Federation |
| System D : 9.x.x.3 | Russia | Banned Federation |
| System E : 9.x.x.4 | UAE | On-Hold Federation |
| System F : 9.x.x.5 | Japan | Full Federation |
| ... | ... | ... |

UTILIZING FEDERATION RELATIONSHIP SETTINGS AMONG DIFFERENT SYSTEMS

BACKGROUND

The present invention relates to data computing and storage, and more specifically, this invention relates to the management and transfer of data between different systems.

Some systems implement hyperconverged infrastructures (HCIs), which are software-defined information technology infrastructures that virtualize the elements of traditional hardware-defined systems. For instance, a HCI includes virtualized computing (e.g., a hypervisor), software-defined storage, and virtualized networking. For systems having HCI, both the storage area network and the underlying storage abstractions are implemented virtually in software rather than physically in hardware. As a result, because the software-defined elements are implemented in the context of the virtualized computing, management of resources can be shared across instances of a hyper-converged infrastructure.

It follows that hyperconvergence evolves away from discrete, hardware-defined systems, toward a software-defined environment in which functional elements are converged by a hypervisor. Consolidation of these functional elements at the hypervisor level, together with federated management, eliminates traditional inefficiencies and reduces the total cost of ownership for data centers. However, while HCI provides some advantages over traditional hardware-defined systems, issues arise when dealing with data from various different locations. For instance, data generated at a given location that is subject to regulatory compliance can impose restrictions on that data when traveling across given boundaries. These boundaries can vary from the geographic location of a country, to geographic locations of a data centers, even to locations of trusted business partners.

SUMMARY

A computer-implemented method, according to one embodiment, includes: determining, for each pair of a plurality of pairs of HCI systems where each pair includes a first HCI system coupled to another HCI system, a federation relationship setting that corresponds to each pair. The federation relationship settings are used to control a flow of data between the first HCI system and the other HCI systems in the respective pairs. The federation relationship settings are also used to control a flow of workload scheduling between the first HCI system and the other HCI systems in the respective pairs. Moreover, determining a federation relationship setting that corresponds to a pair includes: determining whether a risk score which corresponds to the pair is outside a predetermined range. In response to determining that the risk score is outside the predetermined range, a restrictive federation relationship setting is assigned to the pair, and in response to determining that the risk score is not outside the predetermined range, a permissive federation relationship setting is assigned to the pair.

A computer program product, according to another embodiment, includes a computer readable storage medium having program instructions embodied therewith. Moreover, the program instructions are readable and/or executable by a processor to cause the processor to: perform the foregoing method.

A system, according to yet another embodiment, includes: a processor, and logic integrated with the processor, executable by the processor, or integrated with and executable by the processor. The logic is configured to: perform the foregoing method, as well as monitor, by the processor, information associated with a status of each respective pair. The information is further used to dynamically update the federation relationship settings.

Other aspects and embodiments of the present invention will become apparent from the following detailed description, which, when taken in conjunction with the drawings, illustrate by way of example the principles of the invention.

DETAILED DESCRIPTION

Figure 1:
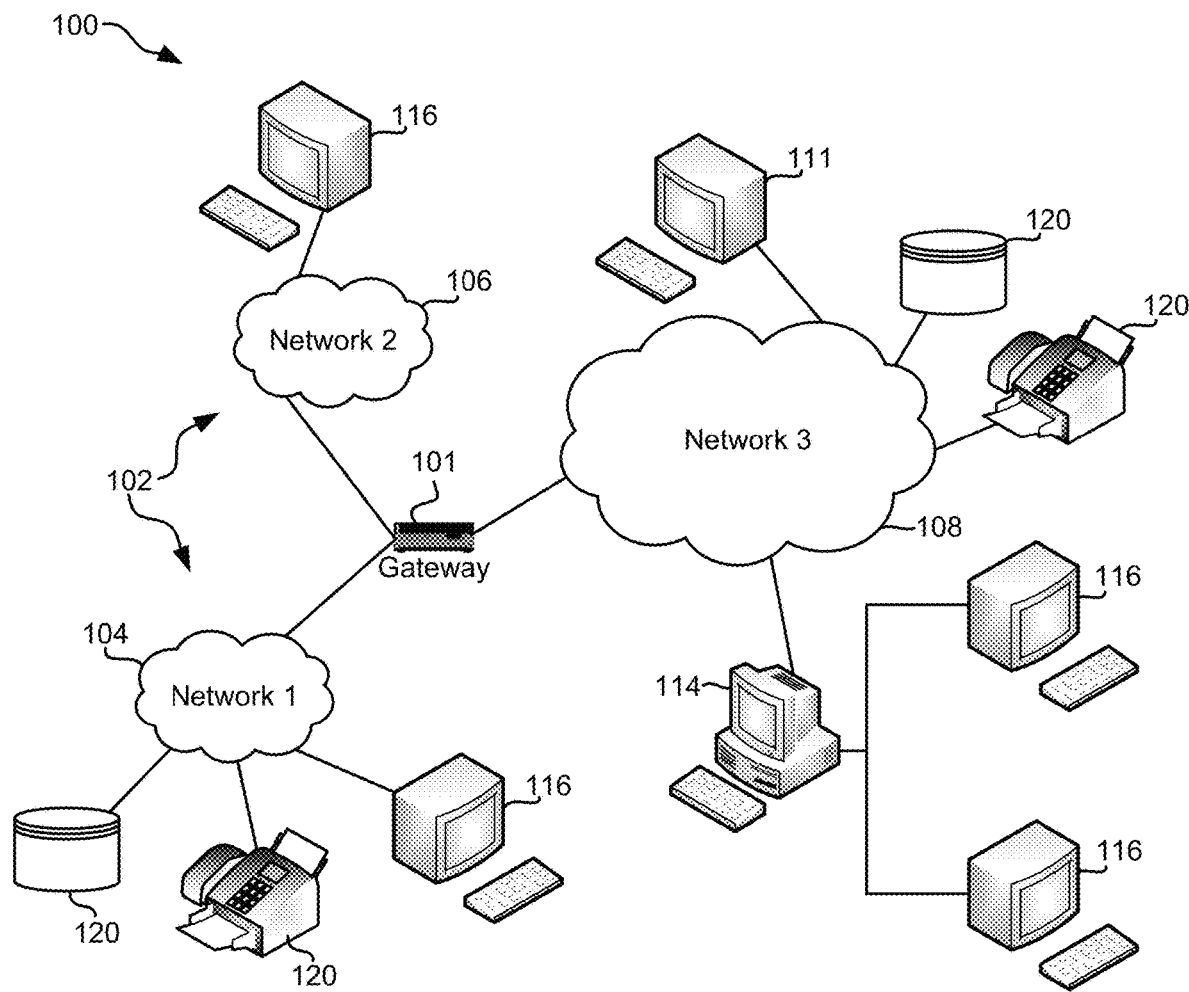
FIG. 1 is a diagram of a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for establishing and implementing federation relationship settings that are used to control the types of data and/or workload scheduling that may be transferred between HCI systems. Moreover, by adhering to location based constraints and meeting the compliance associated with identified data sets such that the data will only be federated with (e.g., transferred to) those HCI systems in the federation which conform with the location based constraints and compliance for that data, various ones of the embodiments herein are able to further improve computational performance by reducing latency and increasing throughput, e.g., as will be described in further detail below.

In one general embodiment, a computer-implemented method includes: determining, for each pair of a plurality of pairs of HCI systems where each pair includes a first HCI system coupled to another HCI system, a federation relationship setting that corresponds to each pair. The federation relationship settings are used to control a flow of data between the first HCI system and the other HCI systems in the respective pairs. The federation relationship settings are also used to control a flow of workload scheduling between the first HCI system and the other HCI systems in the respective pairs. Moreover, determining a federation relationship setting that corresponds to a pair includes: determining whether a risk score which corresponds to the pair is outside a predetermined range. In response to determining that the risk score is outside the predetermined range, a restrictive federation relationship setting is assigned to the pair, and in response to determining that the risk score is not outside the predetermined range, a permissive federation relationship setting is assigned to the pair.

In another general embodiment, a computer program product includes a computer readable storage medium having program instructions embodied therewith. Moreover, the program instructions are readable and/or executable by a processor to cause the processor to: perform the foregoing method.

In yet another general embodiment, a system includes: a processor, and logic integrated with the processor, executable by the processor, or integrated with and executable by the processor. The logic is configured to: perform the foregoing method, as well as monitor, by the processor, information associated with a status of each respective pair. The information is further used to dynamically update the federation relationship settings.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM—based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
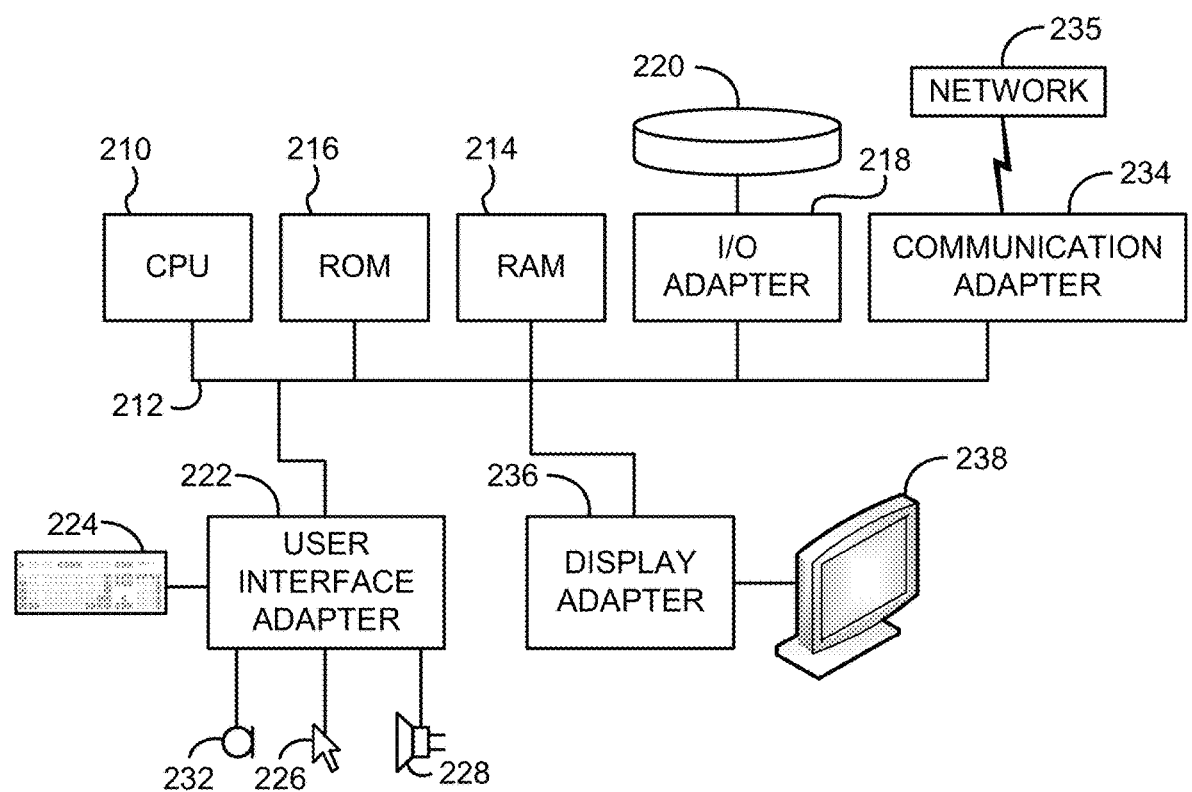
FIG. 2 is a diagram of a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
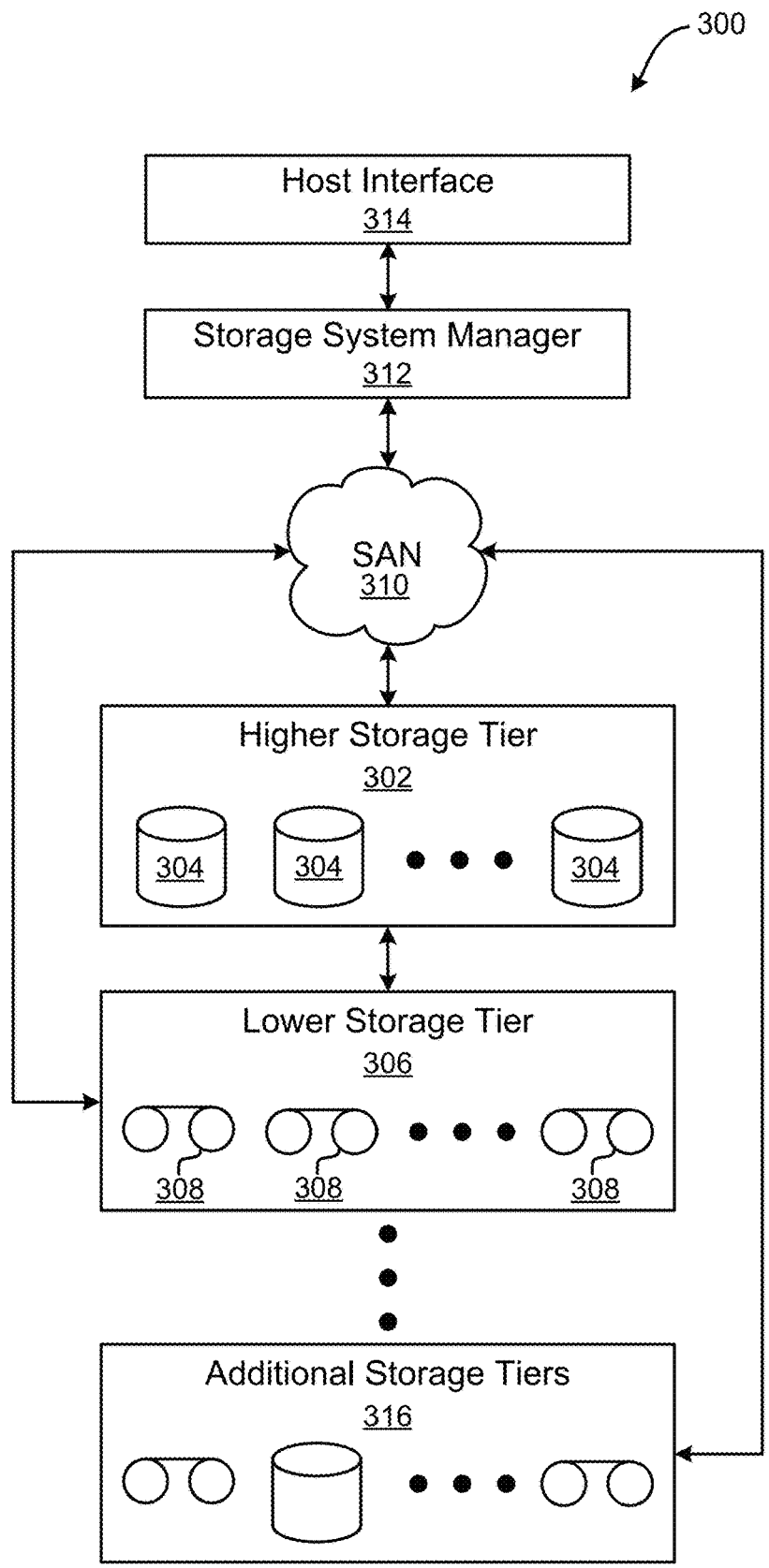
FIG. 3 is a diagram of a tiered data storage system, in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, systems which implement HCI have evolved away from discrete, hardware-defined systems, toward a software-defined environment in which functional elements are converged by a hypervisor. Consolidation of these functional elements at the hypervisor level, together with federated management, eliminates traditional inefficiencies and reduces the total cost of ownership for data centers.

However, while HCI provides some advantages over traditional hardware-defined systems, issues arise when dealing with data from various different locations. For instance, data generated at a given location that is subject to regulatory compliance can impose restrictions on that data when traveling across given boundaries. These boundaries can vary from the geographic location of a country, to geographic locations of a data centers, even to locations of trusted business partners. It follows that previous implementations of systems having HCI have undesirably experienced inefficiencies and functional setbacks that threaten data integrity as well as the operability of these systems as a whole.

In sharp contrast to these conventional shortcomings, various ones of the embodiments included herein are able to successfully and efficiently manage the transfer and processing of data across multiple different systems. Moreover, as these different systems change over time, the manner in which the transfer and processing of data is performed is updated accordingly, e.g., as will be described in further detail below.

Figure 4:
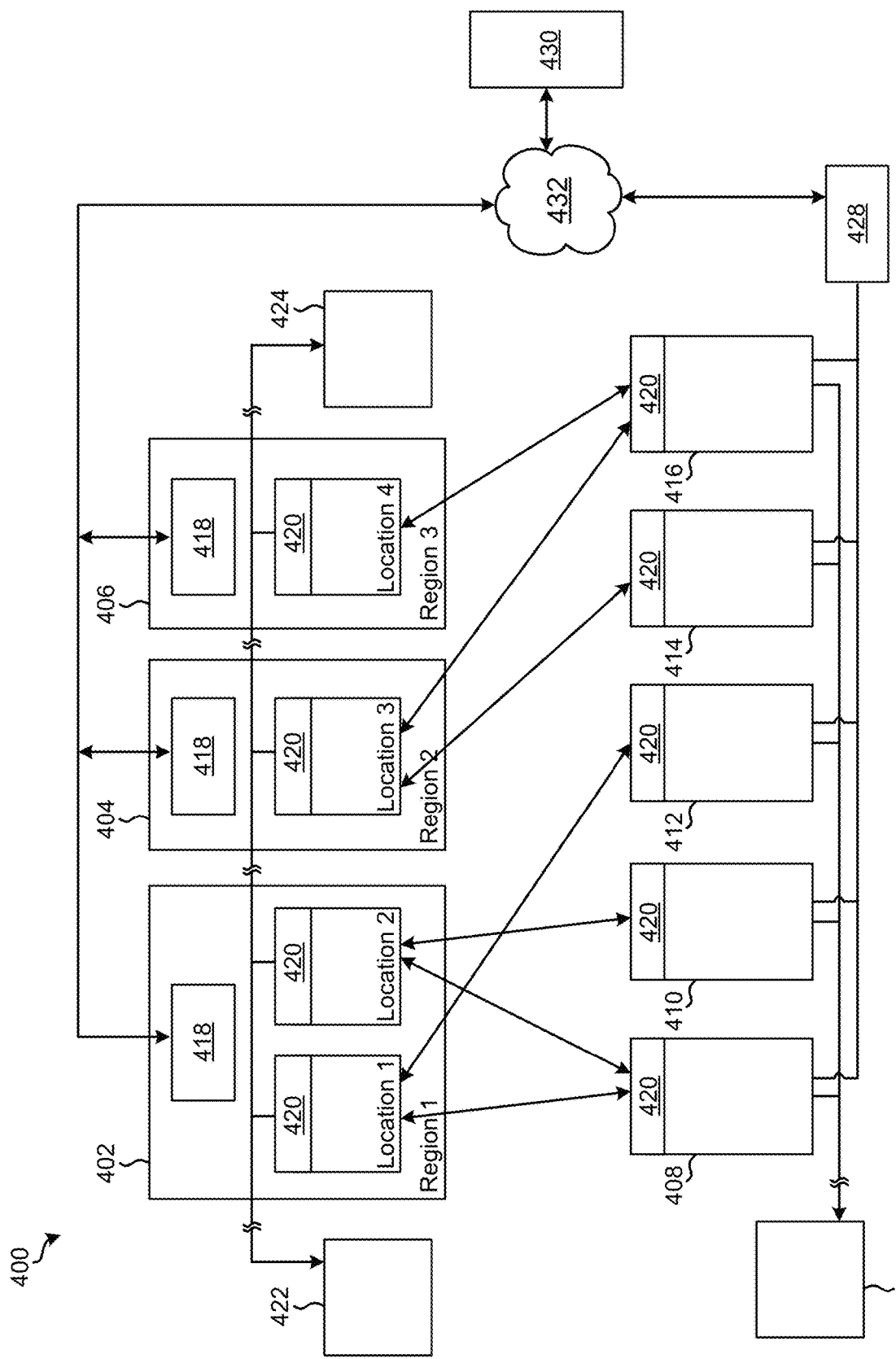
FIG. 4 is a partial representational view of a distributed storage network, in accordance with one embodiment.

Looking now to FIG. 4, a distributed storage network 400 is illustrated in accordance with one embodiment. As an option, the present distributed storage network 400 may be implemented in conjunction with features from any other embodiment listed herein, such as those described with reference to the other FIGS., e.g., such as FIG. 3. However, such distributed storage network 400 and others presented herein may be used in various applications and/or in permutations which may or may not be specifically described in the illustrative embodiments listed herein. Further, the distributed storage network 400 presented herein may be used in any desired environment. Thus FIG. 4 (and the other FIGS.) may be deemed to include any possible permutation.

As shown, the distributed storage network 400 includes a number of HCI systems 402, 404, 406, 408, 410, 412, 414, 416, some of which have a different configuration than others. For instance, HCI systems 402, 404, 406 each correspond to a different region Region 1, Region 2, Region 3, while HCI systems 408, 410, 412, 414, 416 each correspond to a different edge location HCI Edge. While the regional HCI systems 402, 404, 406 may include larger data storage and data processing architectures, the edge processing locations at HCI systems 408, 410, 412, 414, 416 are typically dedicated for computing the data being generated at that respective edge site. However, there are instances where one or more of the HCI systems 408, 410, 412, 414, 416 share the data from that respective edge site with other federated HCI systems from different ones of the edge sites, e.g., as will be described in further detail below.

Each of the HCI systems 402, 404, 406 include a security information and event management (SIEM) module 418 and at least one data center (DC) location therein. Looking specifically to HCI system 402, two different DC locations Location 1, Location 2 are included in the region Region 1, each of which include their own compute module 420.

While included in the same region Region 1, The different DC locations Location 1, Location 2 may be separated any desired amount of physical distance. Looking now to HCI systems 404, 406, each of the regions include only one DC location Location 3, Location 4 in addition to the compute module 420. It is also noted that each of the edge processing locations at HCI systems 408, 410, 412, 414, 416 also include a compute module 420.

Referring still to FIG. 4, while the HCI systems 402, 404, 406 are located at different regions that may be separated across different geographical locations by any desired amount of physical distance, the components included therein are also preferably able to communicate with each other. For instance, each of the locations Location 1, Location 2, Location 3, Location 4 in the HCI systems 402, 404, 406 are shown as being coupled to a centralized federation catalog 422 as well as a policy enforcement point 424. The HCI systems 402, 404, 406 are thereby able to access and modify information that is stored in the centralized federation catalog 422 as well as the policy enforcement point 424. It should be noted that the edge processing locations at HCI systems 408, 410, 412, 414, 416 are also coupled to a policy enforcement point 426 which may be able to at least communicate with policy enforcement point 424 (e.g., over a cloud computing environment). In some approaches, the centralized federation catalog 422 is able to access a centralized view of the various federation settings and how they affect the various HCI system relationships.

As previously mentioned, there are instances where HCI systems share data with other federated HCI systems. Accordingly, certain ones of the HCI systems 402, 404, 406, 408, 410, 412, 414, 416 are coupled to each other as well as with cloud to form a federation. For instance, the federation includes the edge processing location at HCI system 408 which is coupled to both locations Location 1, Location 2 at Region 1 of HCI system 402. With respect to the present description, it should be noted that "coupled to" is intended to indicate that the edge processing location at HCI system 408 is at least able to communicate with (e.g., send and/or receive data, instructions, commands, etc.) both locations Location 1, Location 2 at Region 1 of HCI system 402. It follows that any of the HCI systems 402, 404, 406, 408, 410, 412, 414, 416 in a federation may be coupled to each other using a wireless connection, e.g., WiFi, Bluetooth, a cellular network, etc.; a wired connection, e.g., a cable, a fiber-optic link, a wire, etc.; etc., or any other type of connection which would be apparent to one skilled in the art after reading the present description. For example, certain ones of the HCI systems 402, 404, 406, 408, 410, 412, 414, 416 may be coupled to each other over a cloud computing environment (e.g., see FIGS. 7-8 below).

With continued reference to the edge processing locations at HCI systems 408, 410, 412, 414, 416, they each involve a hyperconverged system which are connected among each other as well as with cloud to form a federation with HCI systems 402, 404, 406 as noted above. Technologies like active file management allow for a common data plane across such federation which potentially allows common namespace and data access across the edge processing locations at HCI systems 408, 410, 412, 414, 416. However, in many edge computing scenarios there is data generated by an edge site that are subject to regulatory compliance which can impose restrictions on where that data is allowed to travel and across which boundaries. As noted above, these boundaries can vary from the geographic location of a country, to geographic locations of a data centers, even to locations of trusted business partners, etc.

For example, government laws (e.g., such as General Data Protection Regulation) may specify that certain data generated from specific edge devices is not permitted to be sent out of the county, or that certain data may be shared, but only with trusted (e.g., listed) geographies. In another example, private industry policies may specify that certain data generated by specific edge device may be federated with HCI systems that are owned by certain partners, collaborators, subsidiaries, etc., and not federated with certain other HCI systems. In yet another example, dynamic controls may specify that in situations where certain data centers have been compromised because of cyber-attack, these data centers are temporarily marked high risk and specific data should not be federated with the HCI systems at those data centers.

It follows that an HCI system federation that extends across various edge sites spread across different geolocations, different data centers, owned by different entities, etc., is subject to numerous constraints. As a result, conventional implementations of HCI systems have experienced significant inefficiencies in the storage, movement, and processing of data. The various HCI systems in such conventional implementations have also undesirably experienced performance delays and increased compute overhead.

In sharp contrast to these conventional shortcomings, the compute modules 420 are desirably used to maintain an accurate representation of which ones of the various HCI systems 402, 404, 406, 408, 410, 412, 414, 416 are able to communicate with each other. In other words, the compute modules 420 analyze and store information which dictates which ones of the various HCI systems 402, 404, 406, 408, 410, 412, 414, 416 are able to send specific types of data and/or compute processing (e.g., workload scheduling) therebetween. As noted above, data that is generated at a given location may be subject to regulatory compliance which can impose restrictions on that data when traveling across given boundaries. These boundaries can vary from the geographic location of a country, to geographic locations of a data centers, even to locations of trusted business partners.

Thus, by maintaining an accurate representation of which types of data and/or types of compute processing may be transferred between each of the specific HCI systems, the compute modules 420 are able to ensure the successful transfer and processing of data as well as compute processing across multiple different systems, each of which may be subject to various different regulations and/or restrictions. Moreover, as these different systems and regulations change over time, the manner in which the transfer and processing of data as well as compute processing is performed updates accordingly, e.g., as will be described in further detail below. It follows that the compute modules 420 may include a processor, daemon, agent, etc., depending on the desired approach.

The compute modules 420 at each of the HCI systems 402, 404, 406, 408, 410, 412, 414, 416 preferably maintain a unique HCI federation list which reflects the types of data and compute processing that the given HCI system is able to send and/or receive from each of the other HCI systems that are coupled thereto. In other words, each HCI system 402, 404, 406, 408, 410, 412, 414, 416 preferably maintains a unique HCI federation list in its respective catalog. Each entry in a HCI federation list corresponds to a different pair of the given HCI system maintaining the unique federation list and the other HCI systems that are coupled thereto. For example, the compute module 420 at Location 2 of HCI system 402 maintains a HCI federation list having: at least one entry which corresponds to the communication channel (see arrowed line) between Location 2 of HCI system 402 and edge processing locations at HCI system 408, and at least one entry which corresponds to the communication channel (see arrowed line) between Location 2 of HCI system 402 and edge processing locations at HCI system 410.

It follows that in preferred approaches, the entries in a HCI federation list include information which represents the types of data and compute processing that the given HCI system is able to send and/or receive from each of the other HCI systems that are coupled thereto. In some approaches, this information is represented as a federation relationship setting which is ultimately used to control the flow of data and workload scheduling between the pair of HCI systems that correspond to the given entry in the HCI federation list (e.g., see method 600 of FIG. 6A below). However, supplemental information associated with the respective pair of HCI systems may also be included in the entries of the HCI federation list. For instance, a HCI federation list entry may include information such as Internet protocol (IP) addresses of the different HCI systems, physical and/or geographical location information associated with the HCI systems, storage capacity information associated with the HCI systems, etc.

Figure 5:
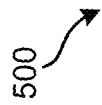
FIG. 5 is a representational view of a HCI federation list, in accordance with an in-use example.

Referring momentarily to FIG. 5, a HCI federation list 500 for a given "HCI system A" is illustrated in accordance with an in-use example, which is in no way intended to limit the invention. As shown, the HCI federation list 500 includes a number of entries, each of which correspond to the relationship between HCI system A and one of the other HCI systems that are coupled to (e.g., able to communicate with) HCI system A. The left-most column in the depicted HCI federation list 500 indicates the name of the HCI systems that correspond to the entries, as well as the IP address of the named HCI systems. The center column further represents the region (e.g., physical location) in which the named HCI systems are located, while the right-most column indicates the federation relationship setting currently applied to each pair of HCI system A and the other HCI systems that are coupled thereto. For example, the top entry in the HCI federation list 500 indicates that a "Full Federation" type federation relationship is currently applied to the pair of HCI system A and HCI system B. It follows that the types of data and compute processing (e.g., workload scheduling) which comply with the full federation type relationship may be sent between HCI system A and HCI system B, while other types of data and compute processing may not be sent between the different systems. It is also preferred that entries in the HCI federation list are updated dynamically as conditions change over time such that the HCI systems avoid any failure events.

Referring back now to FIG. 4, in some approaches the centralized federation catalog 422 may maintain a redundant copy of each of the HCI federation lists that correspond to the various HCI systems. In other approaches, the centralized federation catalog 422 may be used to enhance data access paths between the HCI systems (e.g., using active file management) to ensure that the various federation relationships are adhered to whenever there is any data flow between two given HCI systems (e.g., data federation). With respect to the present description, it should be noted that "data flow" is preferably bidirectional and may include varied terminology of data caching, data consolidation, data distribution, etc. Moreover, the data can be in the form of a file, an object, a block, etc., e.g., depending on the particular approach.

Similarly, in some approaches policy enforcement point 424 and/or policy enforcement point 426 may be used to enhance the workload scheduling and movement between two HCI systems (e.g., compute federation) to ensure that the relevant federation relationship is adhered to whenever there is any workload scheduling across the two HCI systems, e.g., as would be appreciated by one skilled in the art after reading the present description. It follows that with respect to the present description, "data federation" is intended to refer to the process of allowing data from one HCI system to be accessed by another HCI system, e.g., via a caching relationship, direct data access, etc. Moreover, "compute federation" is intended to refer to the process of allowing compute processing (e.g., workload scheduling) of one HCI system to be used by another HCI system on permitted data.

While the various HCI systems 402, 404, 406, 408, 410, 412, 414, 416 are subject to regulatory compliance which can impose restrictions on where data and compute processing may travel and across which boundaries, additional factors may be taken into consideration. For instance, two HCI systems that are permitted to send data and compute processing therebetween according to various regulations and management policies may be experiencing transient changes to operating settings. According to an example, which is in no way intended to limit the invention, one or both of the HCI systems in communication with each other may experience an attempted hack, thereby compromising the current security of the HCI systems. As a result, although the HCI systems are technically permitted to send data and compute processing therebetween, the attempted hack(s) may serve as an additional factor that causes all communication between the two HCI systems to be at least temporarily halted.

The management of these additional factors and how they relate to the current federation relationship setting applied to a given pair of HCI systems may be performed by SIEM modules. Again, each of the HCI systems 402, 404, 406 include a security information and event management (SIEM) module 418, while the edge processing locations at HCI systems 408, 410, 412, 414, 416 are each coupled to a common SIEM module 428. The SIEM modules 418, 428 are thereby able to monitor events that occur and determine whether and how they affect the current federation relationship settings applied to the various HCI systems in the distributed storage network 400. Various factors may be considered when monitoring the events that occur, e.g., as will be described in further detail below. The SIEM modules 418, 428 are also coupled to a central risk management module 430 over a network 432, e.g., such as a cloud computing environment. The central risk management module 430 may thereby be used to actively manage the security of the various HCI systems and the communication channels that extend therebetween. The central risk management module 430 may thereby be able to orchestrate how the current federation relationship settings should be impacted based on the current status of the various HCI systems, allowing for the transfer of data and workload scheduling to be dynamically updated in real time, e.g., as will be described in further detail below.

Figure 6A:
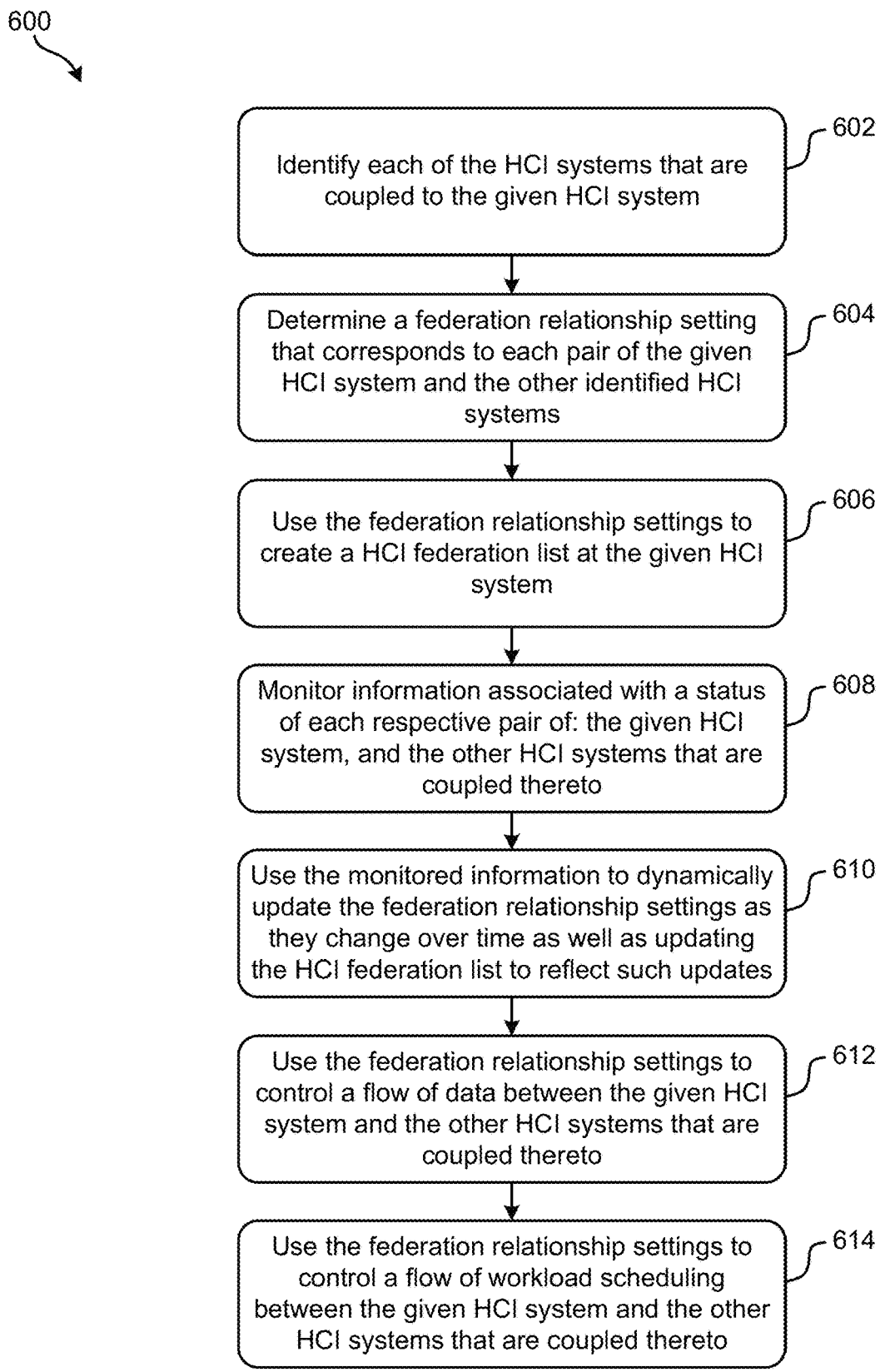
FIG. 6A is a flowchart of a method, in accordance with one embodiment.

Looking now to FIG. 6A, a flowchart of a method 600 for actively managing the transfer of data and workload scheduling between different HCI systems is shown according to one embodiment. It should be noted that the term "workload scheduling" as used herein may refer to the scheduling of any type of processing operations that may be performed by a controller, a processor, a computer, etc. For instance, workload scheduling may include assigning a given processing task to a processor at a different HCI system.

Moreover, the processing task may include data write operations, data read operations, data delete operations, data modification operations, or any other type of operations and/or processes which would be apparent to one skilled in the art after reading the present description.

The method 600 may be performed in accordance with the present invention in any of the environments depicted in FIGS. 1-5, among others, in various embodiments. Of course, more or less operations than those specifically described in FIG. 6A may be included in method 600, as would be understood by one of skill in the art upon reading the present descriptions.

Each of the steps of the method 600 may be performed by any suitable component of the operating environment. For example, one or more of the processes included in method 600 may be performed by a compute module at a given one of the HCI systems (e.g., see 420 of FIG. 4). Accordingly, various ones of the processes included in method 600 are described in the context of being performed at a given one of the HCI systems that is in communication with at least one other HCI system, which is in no way intended to limit the invention. For instance, in various other embodiments, the method 600 may be partially or entirely performed by a controller, a processor, a computer, etc., or some other device having one or more processors therein at a central location, in a cloud computing environment, etc. Thus, in some embodiments, method 600 may be a computer-implemented method. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module (s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As a preliminary point, it is again noted that various ones of the processes included in method 600 are described in the context of being performed at a given one of the HCI systems that is in communication with at least one other HCI system, which is in no way intended to limit the invention and is presented by way of example only. Accordingly, processes that reference "the given HCI system" are intended to refer to the HCI system in which the compute module (e.g., see 420 of FIG. 4) that is actually performing at least some of these processes in method 600 is located.

As shown in FIG. 6A, operation 602 of method 600 includes identifying at least some, and preferably each, of the HCI systems that are coupled to the given HCI system. In some approaches, HCI systems may be identified by sending a query along each communication path extending from the given HCI system to determine the status of the connection and/or what else is coupled thereto.

For each of the HCI systems identified as being coupled to the given HCI system, operation 604 includes determining a federation relationship setting that corresponds to each pair of the given HCI system and the other identified HCI systems. In other words, operation 604 includes determining federation relationship settings that should be used to control the flow of data and workload scheduling between the given HCI system and each respective one of the other identified HCI systems. As noted above, federation relationship settings pertaining to communication channels extending from the given HCI system may be maintained in a HCI federation list (e.g., see FIG. 5) at the given HCI system. In other words, each HCI system in a distributed system may maintain its own HCI federation list which correspond to the various communication channels that extend therefrom. However, in some approaches a central HCI federation list may be maintained at a centralized federation catalog, e.g., for redundancy purposes.

The process of determining a federation relationship setting that should be used to control the flow of data and workload scheduling between two HCI systems may vary depending on the desired approach. As noted above, data generated at a given location may be subject to regulations and management policies which can impose restrictions on that data when being transferred across given boundaries. It follows that different types of information may be used to determine a desired federation relationship setting depending on user preferences, what information is available, predetermined settings, industry standards, etc.

Figure 6B:
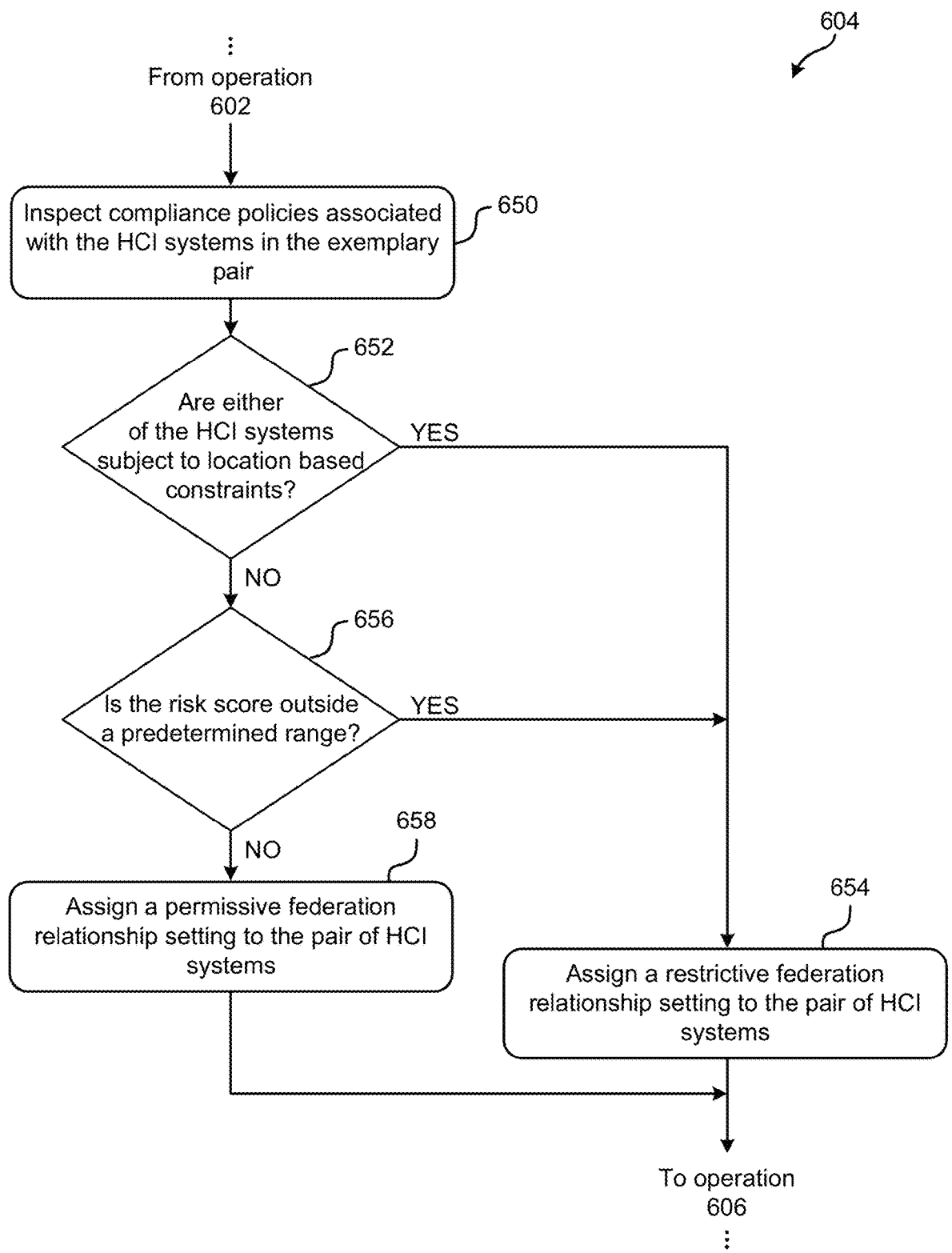
FIG. 6B is a flowchart of sub-processes for one of the operations in the method of FIG. 6A, in accordance with one embodiment.

Referring momentarily now to FIG. 6B, exemplary sub-processes of determining a federation relationship setting that should be used to control the flow of data and workload scheduling between an exemplary pair of HCI systems are illustrated in accordance with one embodiment. Accordingly, one or more of the sub-processes included in FIG. 6B may be used to perform operation 604 of FIG. 6A. However, it should be noted that the sub-processes of FIG. 6B are illustrated in accordance with one embodiment which is in no way intended to limit the invention.

As shown, FIG. 6B includes inspecting compliance policies associated with the HCI systems in the exemplary pair. See sub-operation 650. The compliance policies may be stored at the respective HCI systems themselves, accessible in a central lookup table, requested from a corresponding administrator, received in response to a query sent while identifying the other HCI systems, etc.

Moreover, decision 652 includes determining whether either of the HCI systems in the exemplary pair are subject to one or more location based constraints. Again, HCI systems may extend across various different geolocations, data centers, etc., and may be managed, owned, operated, etc., by different entities. As a result, different HCI systems may be subject to constraints that correspond to the different configurations, management, etc., of the HCI systems themselves. Thus, in response to determining that either of the HCI systems in the exemplary pair are subject to one or more location based constraints, the flowchart proceeds to sub-operation 654. There, sub-operation 654 includes assigning a restrictive federation relationship setting to the pair of HCI systems rather than a permissive federation relationship setting.

With respect to the present description, the "restrictive federation relationship setting" is intended to be at least more restrictive than the "permissive federation relationship setting" in terms of the data and workload scheduling that is permitted to be sent between the two relevant HCI systems. For instance, in some approaches the restrictive federation relationship setting may be a banned federation setting which restricts flow of all data and of all workload scheduling between the two HCI systems. In other approaches, the restrictive federation relationship setting may be an on-hold federation setting which delays the flow of all data and/or of all workload scheduling between the two HCI systems at least temporarily. For instance, the flow of data and/or of all workload scheduling may be delayed until the status of the HCI systems can be further evaluated to determine whether the delayed data and/or workload scheduling should be sent therebetween. In still other approaches, the on-hold federation setting may at least temporarily delay the flow of all data while permitting predetermined types of workload scheduling between the two HCI systems, or vice versa.

Alternatively, in some approaches a permissive federation relationship setting may be a full federation setting which does not restrict the flow of data or of workload scheduling between the pair of HCI systems. In other approaches, a permissive federation relationship setting may be a semi federation setting which only restricts the flow of predetermined types of data and/or of predetermined types of workload scheduling between the HCI systems. The types of data and/or workload scheduling that are restricted under a permissive federation relationship setting may vary depending on the given situation. For instance, some HCI systems may be subject to different considerations, constraints, oversight, etc., that have an effect on the types of data and/or workload scheduling that may be transferred between the HCI systems. Moreover, the specific types of data and/or workload scheduling that is restricted under a permissive federation relationship setting may be predetermined by a user, a network administrator, an algorithm, based on current operating conditions, using industry standards, etc.

Returning now to decision 652, the flowchart proceeds to decision 656 in response to determining that neither of the HCI systems in the exemplary pair are subject to location based constraints. There, decision 656 includes determining whether a risk score that corresponds to the pair of HCI systems is outside a predetermined range. However, it should be noted that "outside a predetermined range" is in no way intended to limit the invention. Rather than determining whether a value is outside a predetermined range, equivalent determinations may be made, e.g., as to whether a value is within a predetermined range, whether a value is above a threshold, whether an absolute value is above a threshold, whether a value is below a threshold, etc., depending on the desired approach.

As noted above, although HCI systems are subject to regulatory compliance which can impose restrictions on where data and workload scheduling may travel and across which boundaries, additional factors may also be taken into consideration. For instance, two HCI systems that are permitted to send data and compute processing therebetween according to various regulations and management policies may be experiencing transient changes to operating settings.

According to an example, which is in no way intended to limit the invention, one or both of the HCI systems in communication with each other may experience an attempted hack, thereby compromising the current security of the HCI systems. As a result, although the HCI systems may technically be permitted to send data and compute processing therebetween, the attempted hack(s) may serve as an additional factor that affects which federation relationship setting is applicable. In other words, although a permissive federation relationship setting is preferably assigned to a pair of HCI systems in response to determining that the HCI systems are not subject to any location based constraints, a risk score may also be considered when assigning the federation relationship setting.

The risk score thereby provides information that is related to both HCI systems in the pair being evaluated. In some approaches the risk scores for each HCI system pair may calculated by the respective HCI systems themselves. For example, a compute module (e.g., see 420 of FIG. 4) at each of the HCI systems may be used to monitor performance of the respective HCI systems and adjust a corresponding risk score dynamically as situations change over time. However, in other approaches the risk scores for the various pairs of HCI systems may actually be calculated and maintained by a central risk management module (e.g., see 430 of FIG. 4). It follows that in such approaches the central risk management module is preferably able to communicate with each of the HCI systems and process information as it is received therefrom in order to dynamically update the various risk scores. The risk scores may be distributed to the various HCI systems periodically, in response to one or more of the risk scores changing, upon experiencing a predetermined event, in response to a request, etc.

Returning to FIG. 6B, it follows that the flowchart proceeds directly to sub-operation 654 in response to determining that the risk score that corresponds to the pair of HCI systems is outside the predetermined range. As noted above, sub-operation 654 includes assigning a restrictive federation relationship setting to the pair of HCI systems before returning to method 600 of FIG. 6A. Thus, although decision 652 revealed that the pair of HCI systems are not subject to location based constraints, a restrictive federation relationship setting is still applied to the pair. It should also be noted that the predetermined range may be set by a user, an administrator, based on the type of HCI system, etc. However, in response to determining that the risk score is not outside the predetermined range at decision 656, the flowchart proceeds to sub-operation 658 which includes assigning a permissive federation relationship setting to the pair of HCI systems before returning to method 600 of FIG. 6A.

Referring back now to FIG. 6A, method 600 proceeds from operation 604 to operation 606. There, operation 606 includes using the federation relationship settings to create a HCI federation list at the given HCI system. The HCI federation list may include a number of entries, each of which correspond to a relationship between the given HCI system and one of the other HCI systems that are coupled thereto. While the general style and contents in the HCI federation list may vary depending on the particular approach, each entry preferably at least indicates the federation relationship setting that corresponds to the respective pair. Additional information may also be included in the HCI federation list, such as the IP address of the HCI systems, the region (e.g., physical location) in which the HCI systems are located, etc., e.g., as seen in FIG. 5.

With continued reference to method 600, operation 608 further includes monitoring information associated with a status of each respective pair of: the given HCI system, and the other HCI systems that are coupled thereto. Depending on the approach, operation 608 may include monitoring any desired type of information associated with the HCI systems. For instance, information including, but not limited to, risk scores, compliance policies, data content and/or type, location based constraints, etc. may continually be monitored in order to identify situations where the federation relationship settings for a given pair of HCI systems should be adjusted to reflect the current status.

In some approaches, a daemon may actually perform the monitoring by determining if there are any central business or compliance policies that are defined and/or updated by centralized risk manager software having location based constraints. In such situations, the monitoring daemon may determine that the federation relationship setting(s) should be made more restrictive. In other approaches, the daemon may monitor by performing enhanced data mining and tagging sub-systems to identify and catalog specific data sets that are subject to location based constraints, e.g., as defined by business policies or regulator compliances. This may be accomplished by performing deep mining, e.g., as would be appreciated by one skilled in the art after reading the present description. In still other approaches, the daemon may monitor by determining which edge devices created certain data and whether such edge devices are subject to restrictive policies, e.g., such as for nuclear accelerators sensors, camera feed from sensitive zones, biometric information (e.g., such as voice, finger print, iris scan, persons generated from sensors, medical related info of persons, etc.), etc. will be categorized and tagged as "not to be federated."

Moreover, operation 610 includes using the monitored information to dynamically update the federation relationship settings as they change over time as well as updating the HCI federation list to reflect such updates.

It should be noted that although operation 608 and 610 are illustrated as being part of the flowchart of method 600, they may actually be performed in the background, e.g., so as to not affect the progression of the other processes included therein. For instance, operations 608 and 610 may be repeated any desired number of times in an iterative fashion such that the HCI federation list is up to date. Thus, although not specifically illustrated in FIG. 6A, operations 608 and/or 610 may be performed periodically, randomly, in response to receiving a request, in response to a predetermined condition being met, etc.

From operation 610, method 600 proceeds to operation 612 which includes using the federation relationship settings to control a flow of data between the given HCI system and the other HCI systems that are coupled thereto. Moreover, operation 614 includes using the federation relationship settings to control a flow of workload scheduling between the given HCI system and the other HCI systems that are coupled thereto. As noted above, the federation relationship settings indicate how data as well as workload scheduling may be transferred between pairs of HCI systems. It follows that the federation relationship setting assigned to a pair of the given HCI system and another HCI system coupled thereto is used to control which types of data and which types of workload scheduling may be transferred between the HCI systems. In a situation where the federation relationship setting assigned to a given pair of HCI systems is changed (e.g., as a result of the monitoring and updating of operations 608 and 610), any queued data or workload scheduling transfers are preferably evaluated in light of the newly applied federation relationship setting. However, in some approaches the newly applied federation relationship setting may only be applied to data and workload scheduling transfers that are initiated after the change to the federation relationship setting has been made.

In some approaches, a centralized federation catalog (e.g., see 422 of FIG. 4) may be used to enhance data access paths between the HCI systems to ensure that the various federation relationship settings are adhered to whenever there is any data flow between two given HCI systems (e.g., data federation). Similarly, in some approaches policy enforcement point (e.g., see 424, 426 of FIG. 4) may be used to enhance the workload scheduling and movement between two HCI systems (e.g., compute federation) to ensure that the relevant federation relationship is adhered to whenever there is any workload scheduling across the two HCI systems, e.g., as would be appreciated by one skilled in the art after reading the present description.

It follows that various ones of the embodiments included herein are desirably able to establish and implement federation relationship settings that are used to control the types of data and/or workload scheduling that may be transferred between HCI systems. These embodiments are also able to adhere to location based constraints and meet the compliance associated with identified data sets such that the data will only be federated with (e.g., transferred to) those HCI systems in the federation which conform with the location based constraints and compliance for that data.

Moreover, these federation relationship settings change dynamically based on various additional factors. For instance, updated location based constraints defined by business policies or regulator compliances may change over time and impact what data and/or workload scheduling two HCI systems are permitted to exchange. The content of the data hosted at a given HCI system may also impact the federation relationship setting that is applied to a related pair of HCI systems. For instance, specific sets of data marked as sticky to a given location, data sets containing important and/or sensitive information, etc., may selectively be excluded from any transfers to other HCI systems. Moreover, constraints based on risk scores for the HCI systems may be determined by a central STEM based threat management system and applied to the respective HCI system pairs.

It should also be noted that although the various ones of the approaches herein have been described in the context of data and/or workload scheduling being transferred between two different HCI systems, this is in no way intended to be limiting. For instance, various ones of the approaches included herein may be applied to situations involving data and/or workload scheduling being transferred between three or more different HCI systems that are coupled to each other, e.g., as would be appreciated by one skilled in the art after reading the present description.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
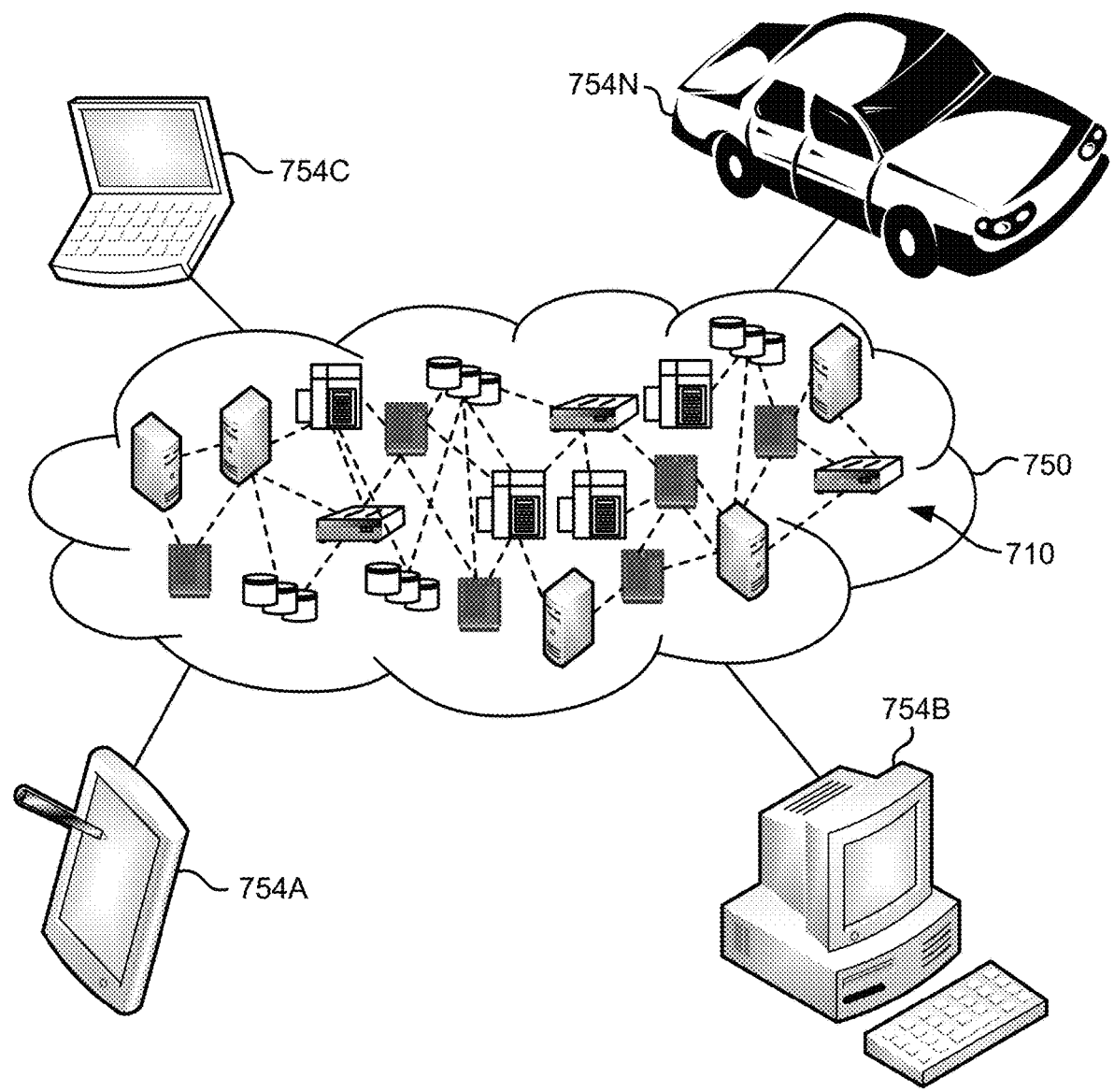
FIG. 7 depicts a cloud computing environment in accordance with one embodiment of the present invention.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-754N shown in FIG. 7 are intended to be illustrative only and that computing nodes 710 and cloud computing environment 750 can communicate with any type of computerized device over any type of network and/or network addressable connection (e.g., using a web browser).

Figure 8:
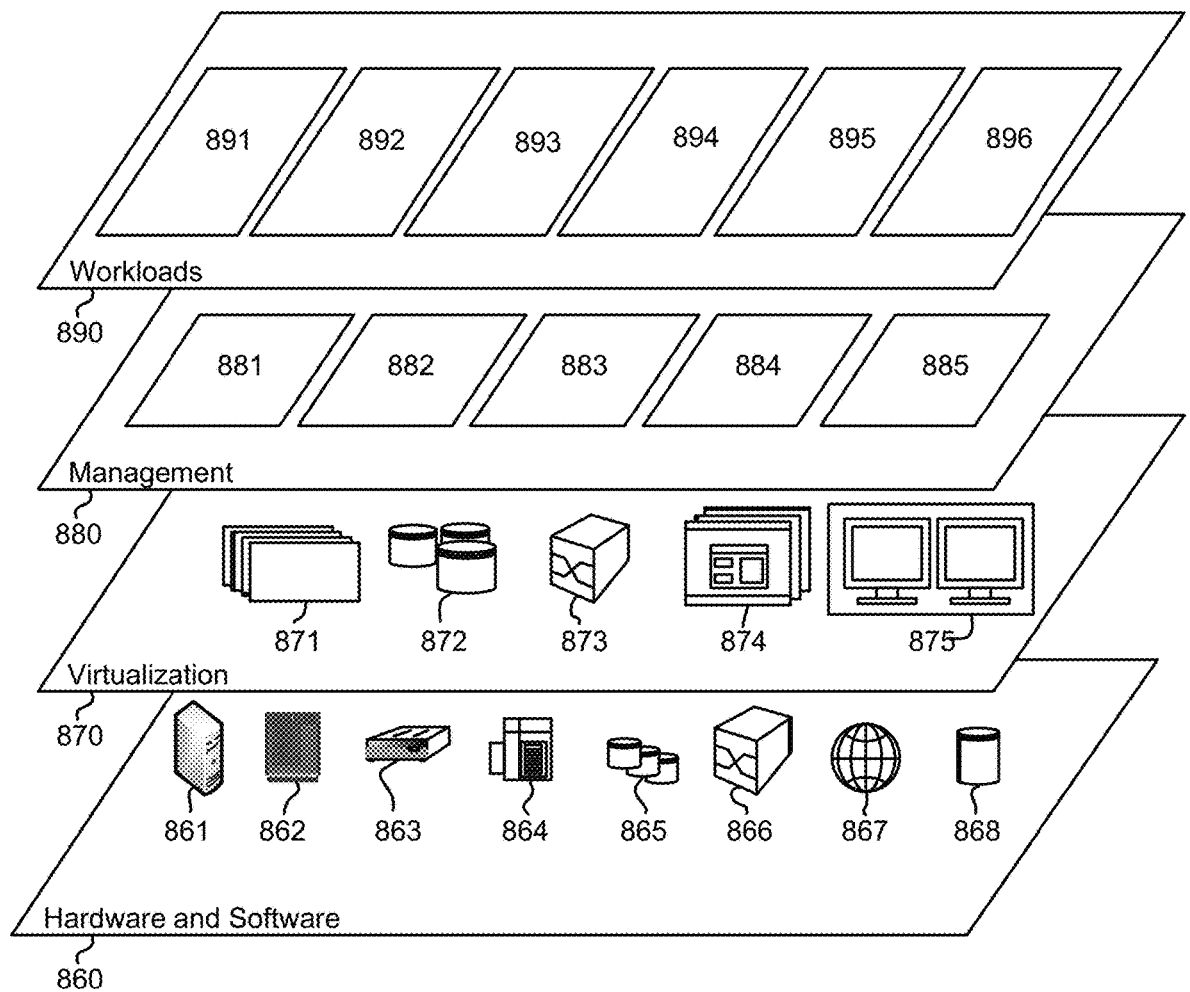
FIG. 8 depicts abstraction model layers in accordance with one embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized.

Examples of workloads and functions which may be provided from this layer include: mapping and navigation 891; software development and lifecycle management 892; virtual classroom education delivery 893; data analytics processing 894; transaction processing 895; and establish and implement federation relationship settings that are used to control the types of data and/or workload scheduling that may be transferred between HCI systems 896, e.g., according to any of the approaches described and/or suggested herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    determining, for a plurality of pairs of hyperconverged infrastructure (HCI) systems, federation relationship settings that correspond to the respective pairs, wherein each of the pairs includes a first HCI system coupled to a second HCI system, wherein determining a federation relationship setting that corresponds to a pair includes:
        determining whether a risk score which corresponds to the pair is outside a predetermined range,
        in response to determining that the risk score is outside the predetermined range, assigning a restrictive federation relationship setting to the pair;
        in response to determining that the risk score is not outside the predetermined range, assigning a permissive federation relationship setting to the pair;
    using the federation relationship settings to control a flow of data between the first HCI system and the second HCI system in the respective pairs; and
    using the federation relationship settings to control a flow of workload scheduling between the first HCI system and the second HCI system in the respective pairs.

2. The computer-implemented method of claim 1, wherein determining a federation relationship setting that corresponds to a pair includes:
    inspecting compliance policies associated with the first HCI system and the second HCI system in the pair;
    determining whether the first HCI system and/or the second HCI system is subject to one or more location based constraints; and
    in response to determining that the first HCI system and/or the second HCI system is subject to at least one location based constraint, assigning the restrictive federation relationship setting to the pair.

3. The computer-implemented method of claim 2, wherein determining a federation relationship setting that corresponds to a pair includes:
    in response to determining that the first HCI system and the second HCI system in the pair are not subject to any location based constraints, assigning a permissive federation relationship setting to the pair.

4. The computer-implemented method of claim 1, wherein the permissive federation relationship setting is selected from the group consisting of: a full federation setting that does not restrict a flow of data or of workload scheduling between the first HCI system and the second HCI system in the pair, and a semi federation setting that restricts a flow of predetermined types of data and/or of predetermined types of workload scheduling between the first HCI system and the second HCI system in the pair.

5. The computer-implemented method of claim 1, wherein the restrictive federation relationship setting is selected from the group consisting of: a banned federation setting that restricts a flow of all data and of all workload scheduling between the first HCI system and the second HCI system in the pair, and an on-hold federation setting that delays a flow of all data and/or of all workload scheduling between the first HCI system and the second HCI system in the pair.

6. The computer-implemented method of claim 1, comprising:
    monitoring information associated with a status of each respective pair; and
    using the information to dynamically update the federation relationship settings.

7. The computer-implemented method of claim 6, comprising:
    using the federation relationship settings to create a HCI federation list at the first HCI system, wherein each entry in the HCI federation list corresponds to a unique one of the pairs,
    wherein using the information to dynamically update the federation relationship settings includes: updating the corresponding entries in the HCI federation list.

8. The computer-implemented method of claim 7, wherein each entry in the HCI federation list includes: the federation relationship setting that corresponds to the respective pair, and supplemental information associated with the respective pair.

9. A computer program product comprising, a computer readable storage medium having program instructions embodied therewith, the program instructions are readable and/or executable by a processor to cause the processor to:
    determine, by the processor for a plurality of pairs of hyperconverged infrastructure (HCI) systems, federation relationship settings that correspond to the respective pairs, wherein each of the pairs includes a first HCI system coupled to a second HCI system, wherein determining a federation relationship setting that corresponds to a pair includes:
  determining whether a risk score which corresponds to the pair is outside a predetermined range,
  in response to determining that the risk score is outside the predetermined range, assigning a restrictive federation relationship setting to the pair;
  in response to determining that the risk score is not outside the predetermined range, assigning a permissive federation relationship setting to the pair;
use, by the processor, the federation relationship settings to control a flow of data between the first HCI system and the second HCI system in the respective pairs; and
use, by the processor, the federation relationship settings to control a flow of workload scheduling between the first HCI system and the second HCI system in the respective pairs.

10. The computer program product of claim 9, wherein determining a federation relationship setting that corresponds to a pair includes:
  inspecting compliance policies associated with the first HCI system and the second HCI system in the pair;
  determining whether the first HCI system and/or the second HCI system is subject to one or more location based constraints; and
  in response to determining that the first HCI system and/or the second HCI system is subject to at least one location based constraint, assigning the restrictive federation relationship setting to the pair.

11. The computer program product of claim 10, wherein determining a federation relationship setting that corresponds to a pair includes:
  in response to determining that the first HCI system and the second HCI system in the pair are not subject to any location based constraints, assigning a permissive federation relationship setting to the pair.

12. The computer program product of claim 9, wherein the permissive federation relationship setting is selected from the group consisting of: a full federation setting that does not restrict a flow of data or of workload scheduling between the first HCI system and the second HCI system in the pair, and a semi federation setting that restricts a flow of predetermined types of data and/or of predetermined types of workload scheduling between the first HCI system and the second HCI system in the pair.

13. The computer program product of claim 9, wherein the restrictive federation relationship setting is selected from the group consisting of: a banned federation setting that restricts a flow of all data and of all workload scheduling between the first HCI system and the second HCI system in the pair, and an on-hold federation setting that delays a flow of all data and/or of all workload scheduling between the first HCI system and the second HCI system in the pair.

14. The computer program product of claim 9, wherein the program instructions are readable and/or executable by the processor to cause the processor to:
  monitor, by the processor, information associated with a status of each respective pair; and
  use, by the processor, the information to dynamically update the federation relationship settings.

15. The computer program product of claim 14, wherein the program instructions are readable and/or executable by the processor to cause the processor to:
  use, by the processor, the federation relationship settings to create a HCI federation list at the first HCI system, wherein each entry in the HCI federation list corresponds to a unique one of the pairs,
  wherein using the information to dynamically update the federation relationship settings includes: updating the corresponding entries in the HCI federation list.

16. The computer program product of claim 15, wherein each entry in the HCI federation list includes: the federation relationship setting that corresponds to the respective pair, and supplemental information associated with the respective pair.

17. A system, comprising:
a hardware processor; and
logic integrated with the processor, executable by the processor, or integrated with and executable by the processor, the logic being configured to:
  determine, by the processor for each pair of a plurality of pairs of hyperconverged infrastructure (HCI) systems, federation relationship settings that correspond to the respective pairs, wherein each of the pairs includes a first HCI system coupled to a second HCI system, wherein determining a federation relationship setting that corresponds to a pair includes:
    determining whether a risk score which corresponds to the pair is outside a predetermined range,
    in response to determining that the risk score is outside the predetermined range, assigning a restrictive federation relationship setting to the pair;
    in response to determining that the risk score is not outside the predetermined range, assigning a permissive federation relationship setting to the pair;
  use, by the processor, the federation relationship settings to control a flow of data between the first HCI system and the second HCI system in the respective pairs;
  use, by the processor, the federation relationship settings to control a flow of workload scheduling between the first HCI system and the second HCI system in the respective pairs;
  monitor, by the processor, information associated with a status of each respective pair; and
  use, by the processor, the information to dynamically update the federation relationship settings.

18. The system of claim 17, wherein determining a federation relationship setting that corresponds to a pair includes:
  inspecting compliance policies associated with the first HCI system and the second HCI system in the pair;
  determining whether the first HCI system and/or the second HCI system is subject to one or more location based constraints; and
  in response to determining that the first HCI system and/or the second HCI system is subject to at least one location based constraint, assigning the restrictive federation relationship setting to the pair.

19. The system of claim 18, wherein determining a federation relationship setting that corresponds to a pair includes:
  in response to determining that the first HCI system and the second HCI system in the pair are not subject to any location based constraints, assigning a permissive federation relationship setting to the pair.

20. The system of claim 17, wherein the permissive federation relationship setting is selected from the group consisting of: a full federation setting that does not restrict a flow of data or of workload scheduling between the first HCI system and the second HCI system in the pair, and a semi federation setting that restricts a flow of predetermined types of data and/or of predetermined types of workload scheduling between the first HCI system and the second HCI system in the pair, wherein the restrictive federation relationship setting is selected from the group consisting of: a banned federation setting that restricts a flow of all data and of all workload scheduling between the first HCI system and the second HCI system in the pair, and an on-hold federation setting that delays a flow of all data and/or of all workload scheduling between the first HCI system and the second HCI system in the pair.

\* \* \* \* \*